April 26, 1960 M. MILLER 2,934,264
SOLUTION FINDING MULTIFACTOR COMBINATION SELECTOR
Filed Aug. 20, 1953 8 Sheets-Sheet 1

INVENTOR
MYRON MILLER

April 26, 1960  M. MILLER  2,934,264
SOLUTION FINDING MULTIFACTOR COMBINATION SELECTOR
Filed Aug. 20, 1953  8 Sheets-Sheet 2

INVENTOR
MYRON MILLER
BY
ATTORNEYS

April 26, 1960    M. MILLER    2,934,264
SOLUTION FINDING MULTIFACTOR COMBINATION SELECTOR
Filed Aug. 20, 1953    8 Sheets-Sheet 3

INVENTOR
MYRON MILLER

BY
ATTORNEYS

April 26, 1960 M. MILLER 2,934,264
SOLUTION FINDING MULTIFACTOR COMBINATION SELECTOR
Filed Aug. 20, 1953 8 Sheets-Sheet 4
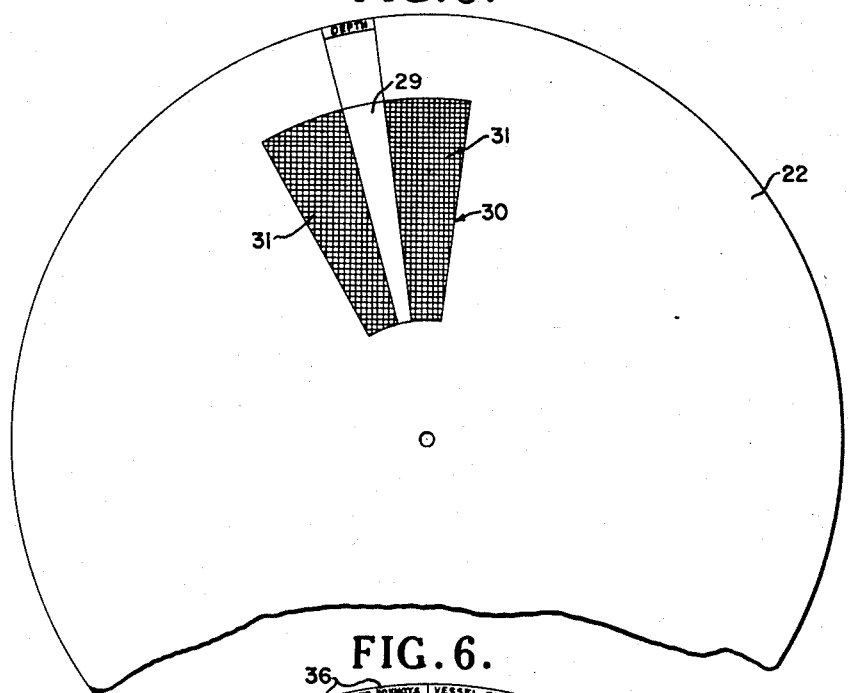
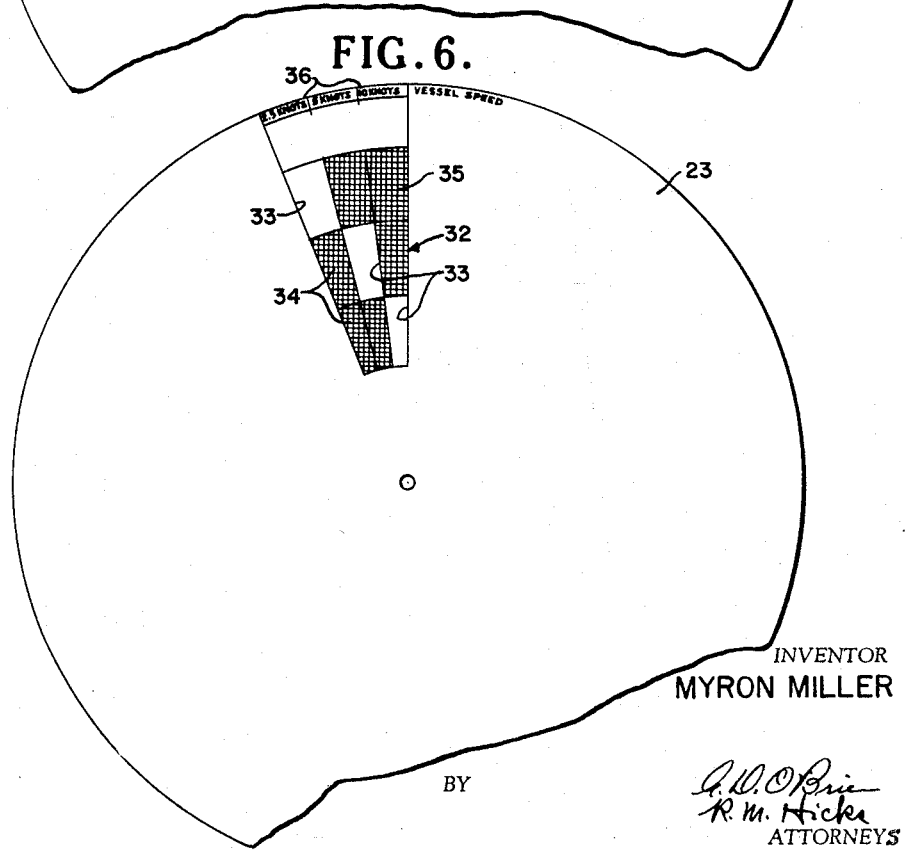
INVENTOR
MYRON MILLER
BY
ATTORNEYS April 26, 1960     M. MILLER     2,934,264
SOLUTION FINDING MULTIFACTOR COMBINATION SELECTOR
Filed Aug. 20, 1953     8 Sheets-Sheet 5

INVENTOR
MYRON MILLER

BY
*ATTORNEYS*

April 26, 1960  M. MILLER  2,934,264
SOLUTION FINDING MULTIFACTOR COMBINATION SELECTOR
Filed Aug. 20, 1953  8 Sheets-Sheet 7

INVENTOR
MYRON MILLER

BY
ATTORNEYS

April 26, 1960 M. MILLER 2,934,264
SOLUTION FINDING MULTIFACTOR COMBINATION SELECTOR
Filed Aug. 20, 1953 8 Sheets-Sheet 8

INVENTOR
MYRON MILLER

BY
ATTORNEYS

United States Patent Office 2,934,264
Patented Apr. 26, 1960

2,934,264

SOLUTION FINDING MULTIFACTOR COMBINATION SELECTOR

Myron Miller, Silver Spring, Md.

Application August 20, 1953, Serial No. 375,580

6 Claims. (Cl. 235—88)

(Granted under Title 35, U.S. Code (1952), sec. 266)

The invention described herein may be manufactured and used by or for the Government of the United States of America for governmental purposes without the payment of any royalties thereon or therefor.

The present invention relates to a selector and more particularly to a new and improved manually operated multi-variable selector device for quickly and accurately obtaining the solution to a problem involving a large number of variables and is applicable to many problems concerning innumerable items, devices and materials. For example, if desired the selector device may be conveniently employed for determining the type of ordnance missile to be used during a mine planting operation under varying conditions and prevailing circumstances, wherein numerous combinations of factors are provided, one of which will determine the proper type of missile to be used when the final operation of the device has been completed. Moreover, the underlying principle of the device resides in dispersing over a base member in regular circumferential and radial order a large number of indicia, any one of which after the final working of the device becomes a code symbol. For example, the device is actuated sufficiently to produce a single master symbol, the symbol becomes the key which indicates one item in a large assortment of such items from which the selection is to be made. Furthermore, the process of segregation goes on during the working of the device and thus out of perhaps hundreds of indicia on the base member only one will be visible in the final analysis, to become the key from which the next cue is taken. Moreover, the aforesaid segregation involves the operation of a plurality of superimposed discs, each disc being provided with suitable windows which become narrowed down during the operation of the device thereby to provide a single window, and thus through this single window the ultimate indicia appears.

An object of the present invention is to provide a selector device adapted to quickly and accurately solve a problem involving a large number of variables.

Another object of the invention is the provision of a new and improved multifactor combination selector for selectively calculating and indicating numerous combinations of factors in accordance with certain information and known conditions.

Still another object of the invention is the provision of a new and improved selector device wherein a master symbol is produced as the device is actuated to its final position thereby to selectively determine the type of missile to be used during the course of a bombing mission or during a mine planting operation as the case may be.

Still another object of the invention is the provision of a new and improved selector device wherein any combination of a large number of variables bearing on any problem may be selected, and upon selection reveal the solution to the problem.

Other objects and many of the attendant advantages of this invention will be readily appreciated as the same becomes better understood by reference to the following detailed description when considered in connection with the accompanying drawings wherein:

Figs. 4, 5, 6, 7 and 8 are plan views of the superimposed rotatable discs of the selector device of Fig. 1, respectively, in the order in which they are stacked on the base disc for the instrument;

Figure 1:
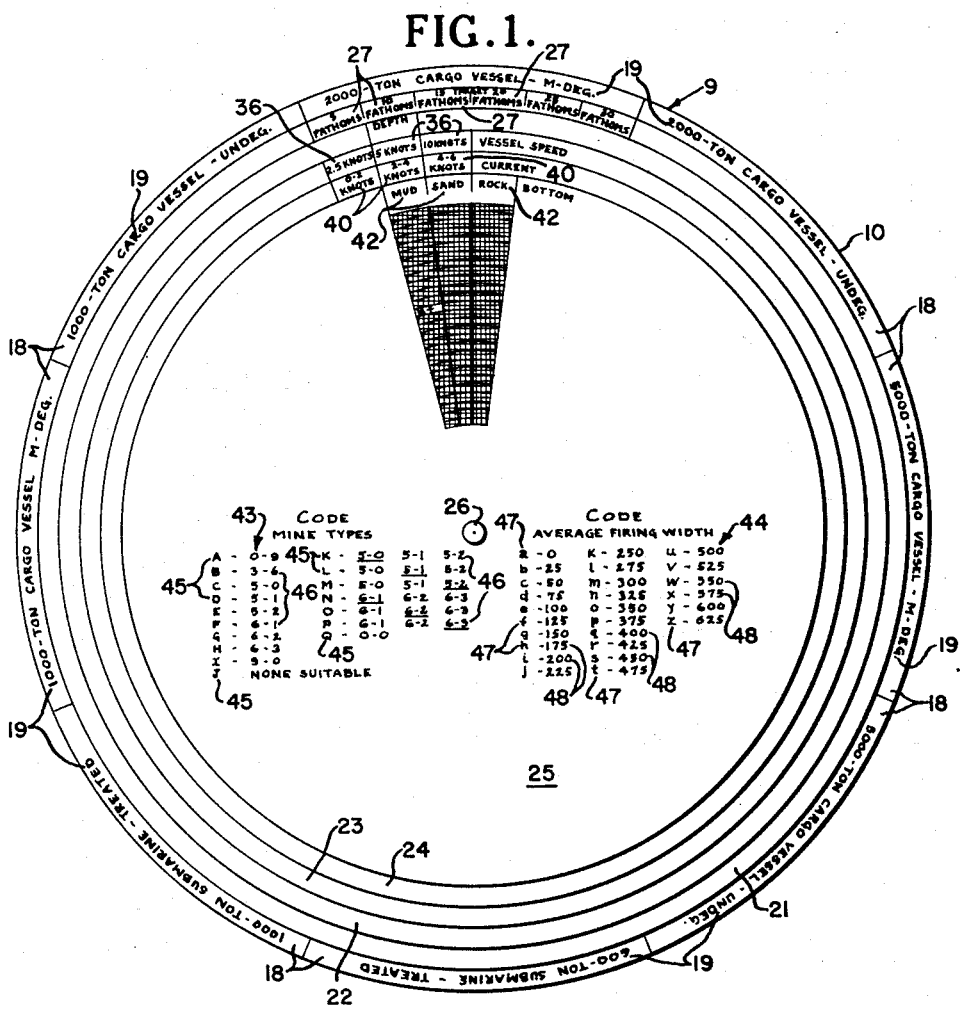
Fig. 1 is a plan view of the device of the present invention in accordance with a preferred embodiment thereof.
Figure 3:
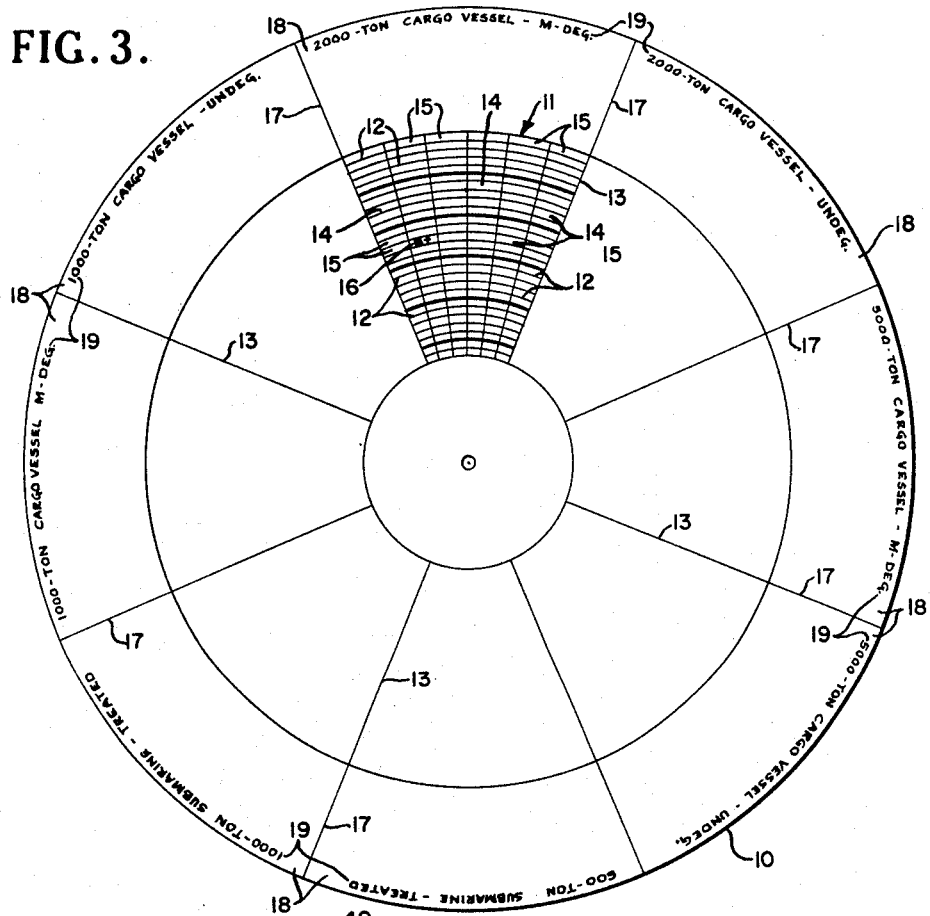
Fig. 3 is a plan view of the base disc of Fig. 1.

Referring now to the drawings and more particularly to Figs. 1 and 3 thereof, the numeral 9 generally indicates the selector device of the present invention comprising a base disc 10 provided with a circular graph 11. The graph is subdivided by circular and radial lines 12 and 13 providing a large number of sectors 14, each sector having a large number of frames or blocks 15 provided with an indicia 16, any one of which will become a code symbol when the device has been manipulated to the final setting. As more clearly shown on Fig. 3, the radial lines 17 on the base disc 10 extend to the peripheral portion of the disc whereupon the outer portion of the disc is subdivided into relatively large sectors 18, each sector being provided with a suitable legend 19 disposed in proximate relation with respect to the outer edge portion of disc 10. The aforesaid legends indicate the tonnage, type and the magnetic characteristics of the target vessels respectively.

Figure 2:
Fig. 2 is a side elevational view of the selector instrument of Fig. 1.
Figure 4:
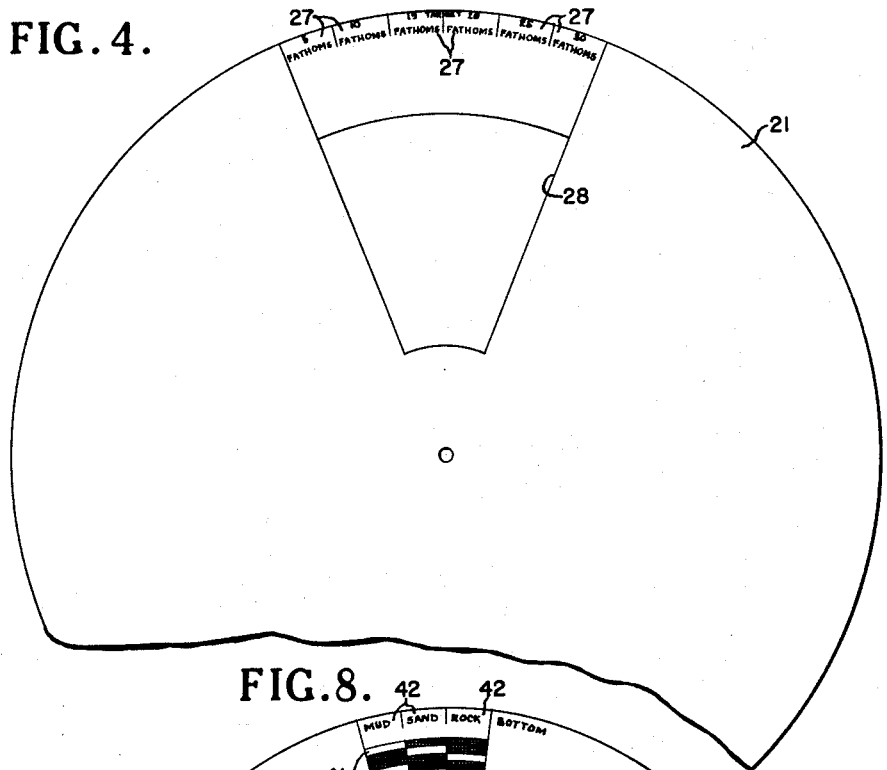

As is more clearly shown on Figs. 1 and 2, a plurality of superimposed concentric discs 21, 22, 23, 24 and 25 of progressively smaller diameters are stacked upon disc 10 and rotatably supported on a pin or grommet 26, the grommet being secured to the base disc 10 in any conventional manner. Furthermore, by the aforesaid disc arrangement it will be noted that the marginal or outer surfaces of discs 10, 21, 22, 23, 24 and the entire face of the outermost disc 25 is exposed for visible observation by the operator. The disc 21 has printed on the margin thereof the word target which is adapted selectively to be moved into alignment with the legends 19 on disc 10. For example, assuming that the target vessel is a 2000 ton cargo vessel M degaussed the word target must be moved into alignment with this particular legend to complete the first step in the operation of the device. When this has been done the disc 21 has definite relationship with respect to the indicia 16 on the disc 10. Disc 21 is further provided with a plurality of subdivisions 27, each subdivision being provided with a depth legend of 5 fathoms intervals starting at 5 fathoms and ending at 30 fathoms, Fig. 4. A window 28 is arranged within the disc 21 and disposed subjacent the subdivisions 27.

With reference to disc 22 it will be noted that the marginal edge thereof has printed thereon the word depth, the disc being provided with a window 29 disposed within a sector 30 and bordering on a pair of opaque sectors 31. The window 29 in disc 22 is considerably narrower than the window 28 in disc 21, however, the overall proportion of the sector 30 of disc 22 is substantially the same as the window 28. Furthermore, during the operation of the device, the word depth on disc 22 is adapted to be aligned with the appropriate fathom legend on disc 21.

As more clearly shown on Fig. 6, disc 23 is provided with a sector 32 having three windows 33 arranged therein and staggered angularly and radially with respect to each other, the windows bordering on opaque portion 34 and 35. The marginal portion of disc 23 is provided with the legend, vessel speed, supplemented with notations 2.5 knots, 5 knots, and 10 knots which are arranged in frames 36, respectively, the frames being confined within the limits of sector 32.

Figure 7:
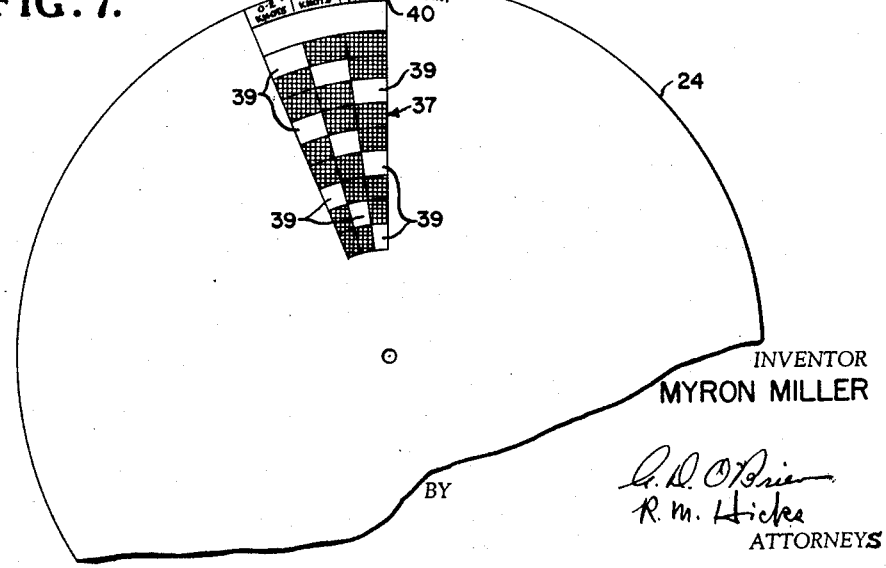
Figure 8:
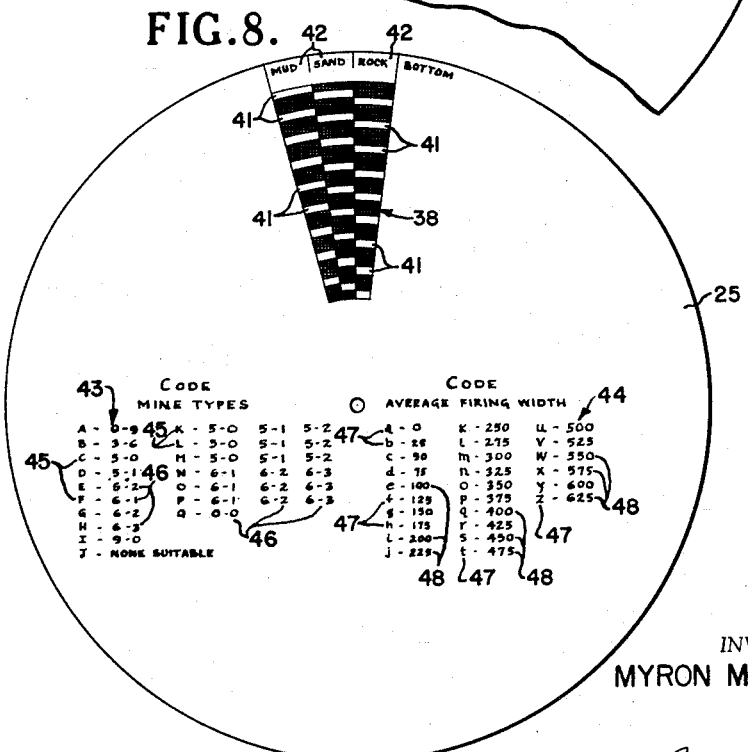

The discs 24 and 25 are provided with sectors 37 and 38, respectively, which are the same size with respect to each other and with respect to the sector 32 in disc 23. The sector 37 of disc 24 is provided with angularly offset and radially stepped windows 39, arranged in three groups with three windows in each group, Fig. 7, the aforesaid windows 39 being similar to the windows 33 in disc 23. The marginal portion of disc 24 is provided with the legend, Current, supplemented with notations, 0–2 knots, 3–4 knots and 4–6 knots which are arranged within frames 40, respectively, the frames being confined within the limits of sector 37, Fig. 8. The sector 38 of disc 25 is provided with angularly offset and radially stepped windows 41 arranged in nine groups with three windows 41 in each group and similar to the window arrangement of discs 23 and 24. The marginal portion of disc 25 is provided with the legend, Bottom, supplemented with notations, Mud, Sand and Rock which are arranged within frames 42, respectively, the frames being confined within the limits of sector 38, Fig. 8. Furthermore, disc 25 is provided with suitable charts 43 and 44, chart 43 comprises a series of code letters 45 having complementary numerical characters 46 and chart 44 comprises a series of code letters 47 having complementary numerical characters 48. The aforesaid code letters 45 and 47 are adapted to correspond to one of the symbols or indicia 16 on the base disc 10 when the selector device is operated and correlated to the end. It will be understood, however, the legends and notations on discs 10, 21, 22, 23, 24 and 25 indicate the factors variables to be fed into the sector to determine the proper missile to be used in a particular mine operation. For example, when the device is worked to the end, a single master symbol or indicia 16 will appear in a single window, Fig. 1, the symbol then becomes the key which corresponds to the complementary code letters on the mine and firing width charts 43 and 44 and thus the proper mine may be selected quickly and put into service. Furthermore, during the operation of the device, it will be understood that a process of segregation occurs and thus this process of segregation involves all of the superimposed discs 10 through 25. However, during the aforesaid operations the windows in the discs are progressively blanked out in such a manner that when the final setting of the device is completed the window arrangement becomes narrowed down to a single window through which the ultimate indicia 16 appears.

In operation of the device, assuming, for example, that a harbor is intended to be mined against the traffic of 2,000 ton cargo vessel, M-Degaussed and it is known that the vessel will enter the harbor at a minimum of five knots. Upon investigation of the hydrographic charts it is found that the water in this particular harbor to be 10 fathoms, the currents 3 knots and the bottom muddy. When this has been done, reference is made to the legend 19 on the outer edge of disc 10 corresponding to the known characteristics of the target vessel. With this in view, all further correlation of the device will occur in the selected sector 18 on disc 10. For example, disc 21 is rotated until the target sector thereof is aligned with the selected sector 18 of disc 10, disc 22 is rotated until legend depth aligns with the 10 fathom legend on disc 21. When this has been done, discs 10, 21 and 22 are held against rotative movement while disc 23 is rotated until the 5 knot legend thereon is aligned with the aforesaid depth legend. For further correlation of the device, discs 10, 21, 22 and 23 are held against rotative movement while disc 24 is rotated to align the 2–4 knot legend thereon with the legend depth on the aforesaid disc 22. In the final operation of the selector, discs 10, 21, 22, 23 and 24 are held against rotation while disc 25 is rotated to align the legend mud thereon with the legend depth. However, during the operation and correlation of the device, the windows in the superimposed discs 21 through 25 are narrowed down until but a single window is exposed when the device has been correlated to the end and thus it is through this window that the ultimate indicia 16 or symbol on disc 10 appears. The indicia which appears in the window in this instant is N$f$, N refers to the corresponding code letter on chart 43 and $f$ refers to the corresponding code letter on chart 44. Thus by comparing the master symbol 16 with the corresponding code letters on charts 43 and 44, the desired answer is obtained. For example, with reference to chart 43, it will be noted that N designates types 6–1, 6–2 and 6–3 mines, and with reference to chart 44 it will be noted that $f$ designates the average firing width of the recommended mines under prevailing conditions will be 125 feet. Thus by the aforesaid arrangement it will be noted that the solution to type or types of mines to be used during a particular mine operation is quickly and efficiently determined as well as the average firing width of the mines selected.

Figure 9:
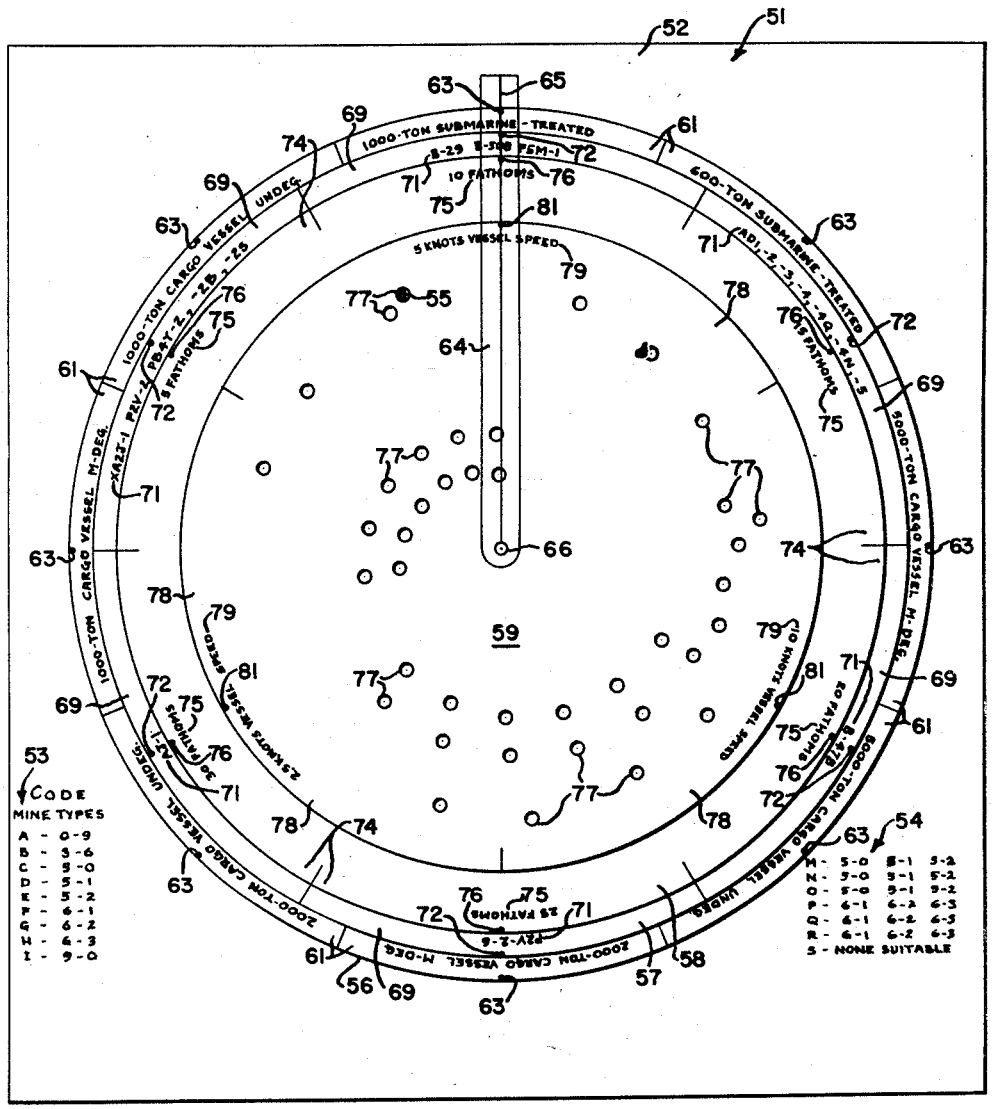
Fig. 9 is a plan view of an alternate arrangement of the device of Fig. 1.

Referring now to Fig. 9 which illustrates an alternate arrangement of the device of Fig. 1, the numeral 51 generally indicates the selector device comprising a base 52. The base is in the form of a square in order to provide sufficient room thereon to print the code charts 53 and 54. As shown more clearly on Fig. 10 and dispersed around the center of the base 52 is a plurality of code symbols 55, one of which becomes the master symbol and provides means for solving a specific problem when considered in connection with the aforesaid charts 53 and 54, the solving of such a problem being more clearly set forth as the description proceeds. It will be noted on Fig. 10 that the code symbols 55 are uniformly dispersed both angularly and radially about the base 52 and are arranged in a plurality of evolute curve formations which form a series of spirals, repeatedly displaced circumferentially. In order to clarify this statement, attention is directed to superimposed discs 56, 57, 58 and 59 which are adapted to coact with the disc 51 during the working of the device. Such discs are clearly shown on Figs. 11, 12, 13 and 14, respectively. Disc 56 is subdivided into eight segments 61 having suitable legends 62 printed in each segment which designates various types of target vessels. Disposed in the center of each segment 61 of disc 56 and positioned close to the margin thereof is a reference mark or indexing element 63 in the form of a dot.

Figure 10:
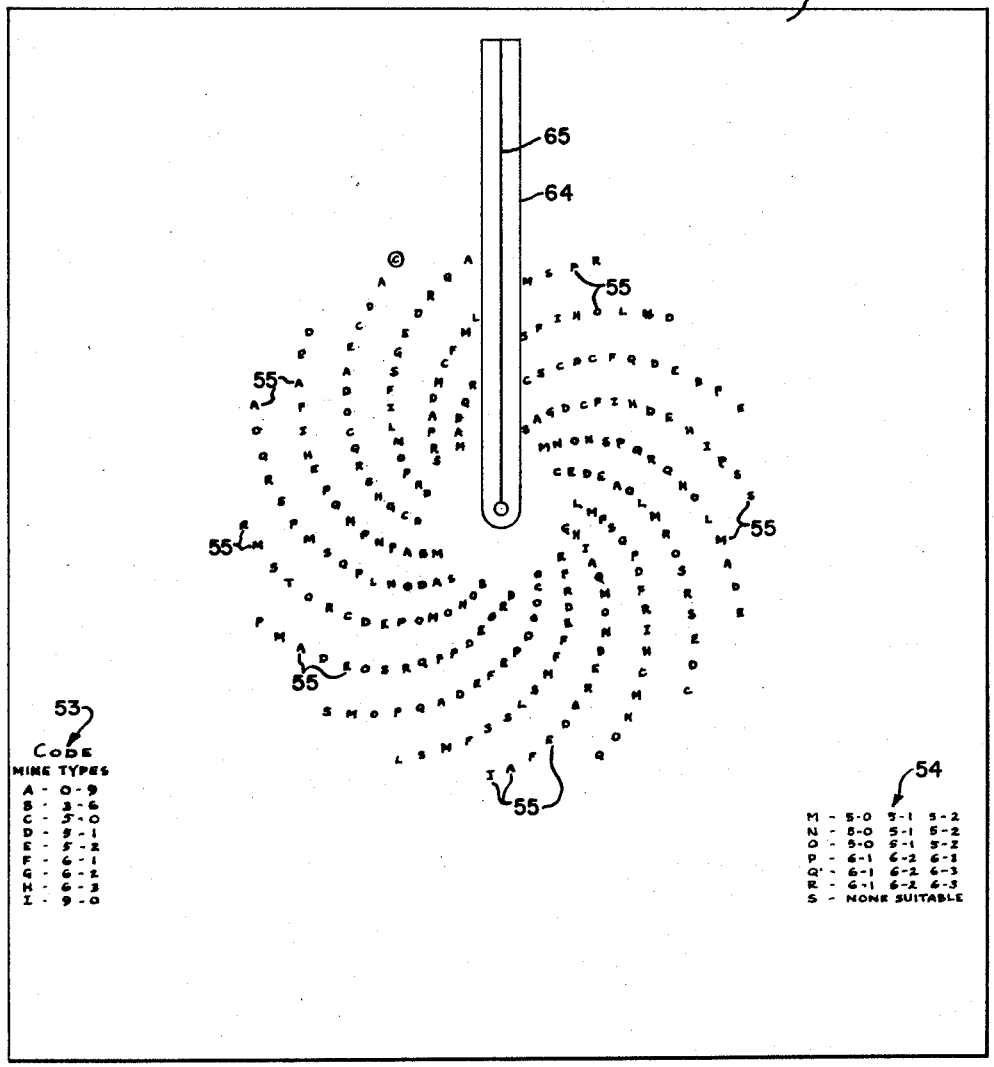
Fig. 10 is a plan view of the base member of Fig. 9.
Figure 11:
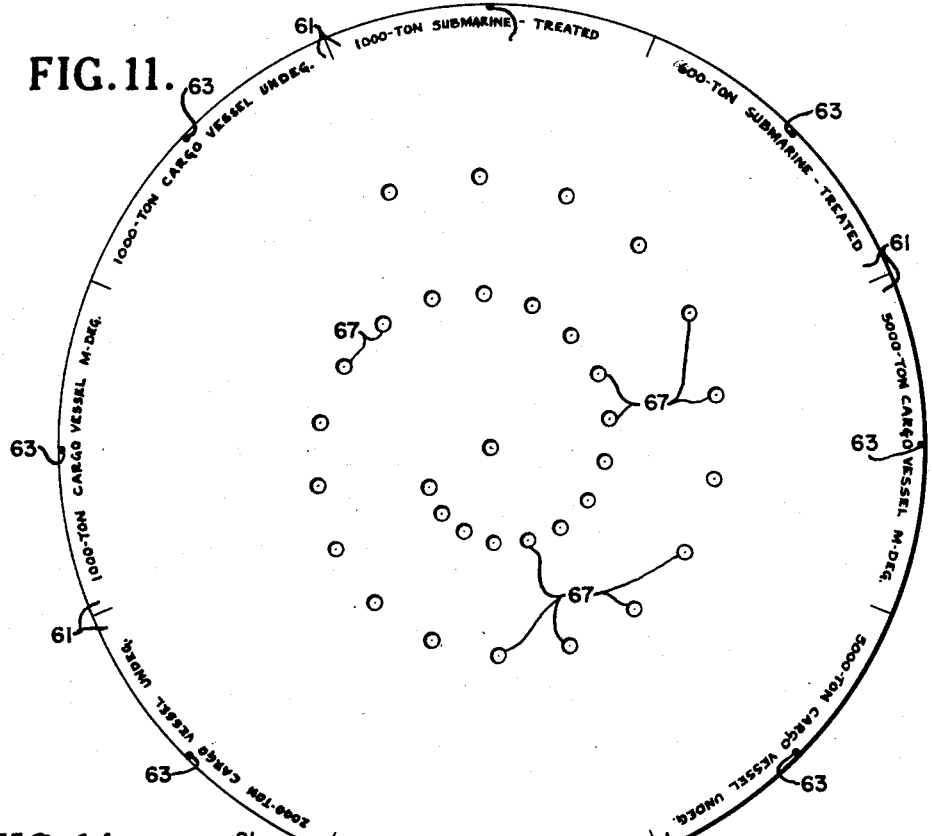
Figs. 11, 12, 13 and 14 are plan views of the superimposed rotatable discs of the device of Fig. 10, respectively, in the order in which they are stacked on the base member.
Figure 14:
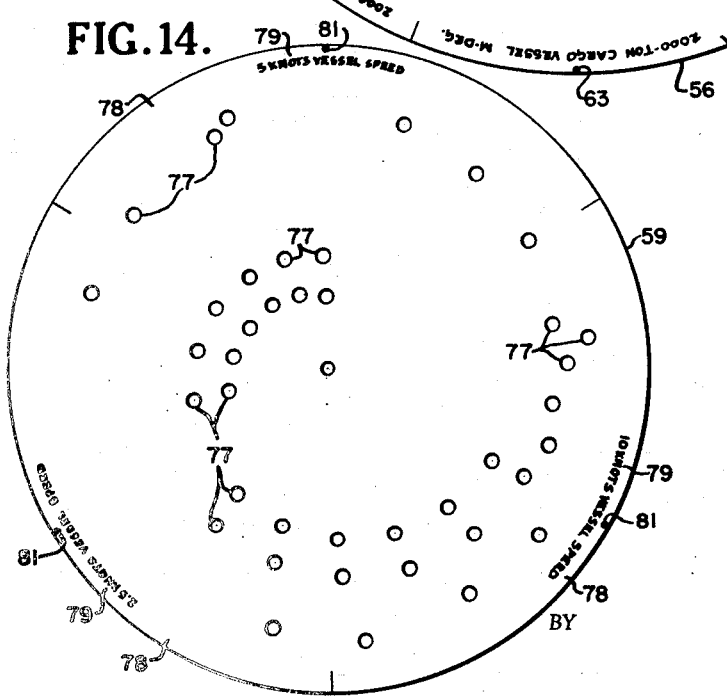
Figure 12:
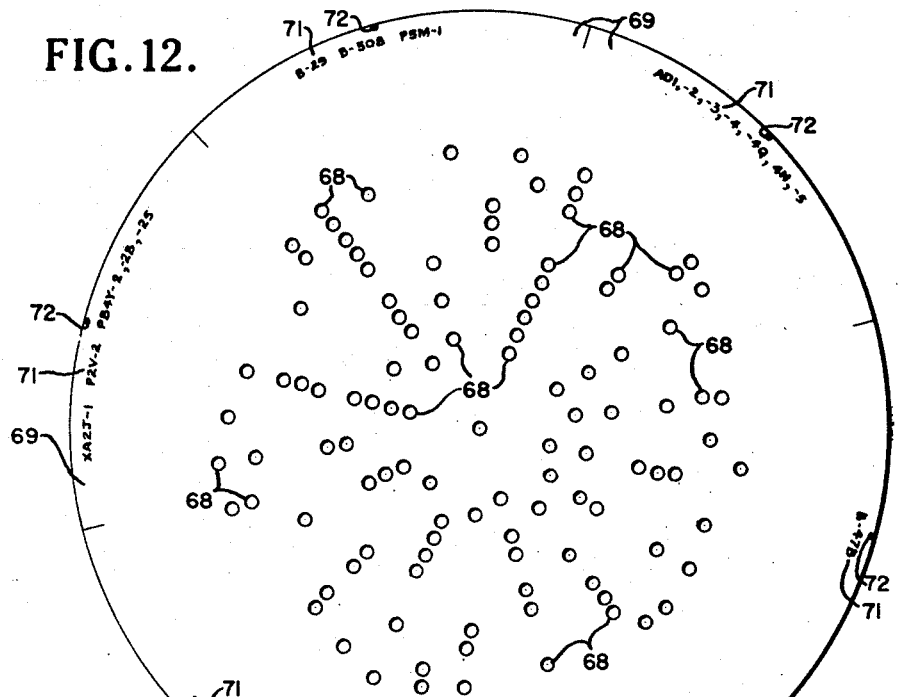

As shown on Fig. 10, a transparent strip 64 is secured to the base 52, the strip extending outwardly from the center of base 52 and terminating a short distance from one edge thereof, the strip being provided with a hairline 65. It will be noted that the discs 56, 57, 58 and 59 are rotatably mounted on a centrally disposed pin 66 carried by the base 52 whereupon the discs may be selectively rotated with respect to the base 52.

Disc 56 is provided with a series of spirally arranged openings 67. Disc 57 is provided with a series of openings 68 which are dispersed over the disc in radial order, the disc being subdivided on the outer edge or periphery thereof into six sectors 69, each sector having a legend 71 therein and a centrally disposed reference or indexing element 72. The legends in the sectors 69 represent various types of mine planting aircraft.

Figure 13:
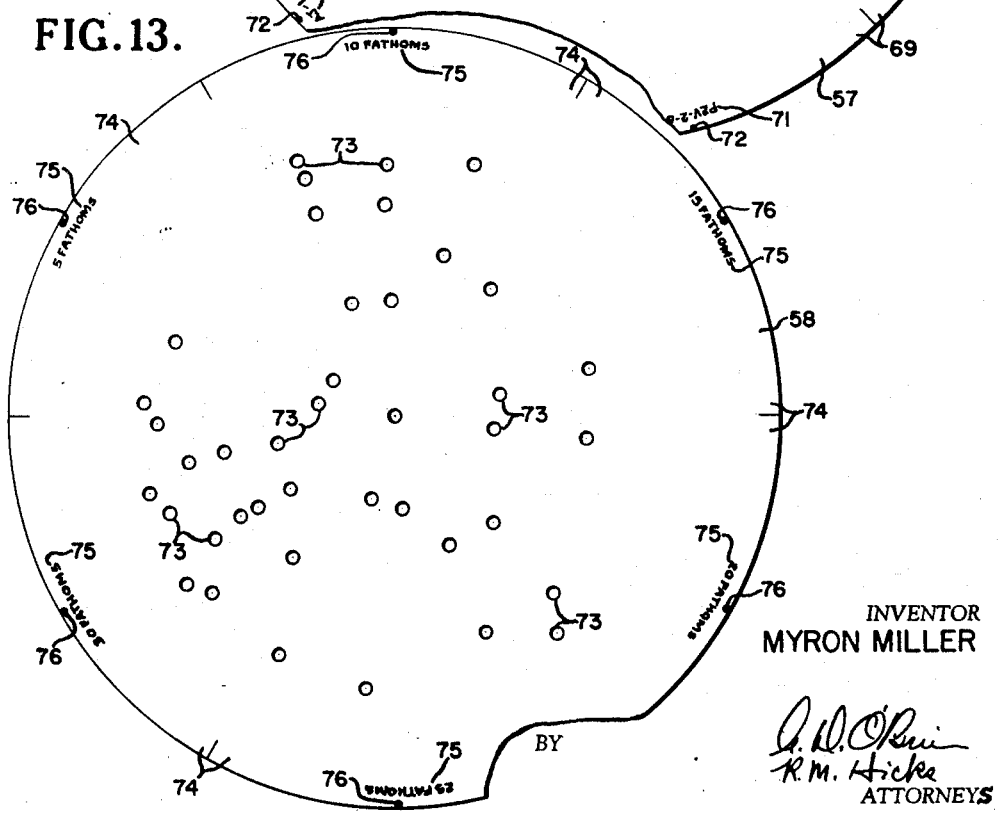

As more clearly shown on Fig. 13, disc 58 is provided with a plurality of openings 73 and having the periphery thereof subdivided into six sectors 74, each sector being provided with a legend 75, designating varying depths, varying from 5 to 30 fathoms. The sectors 74 are each provided with a centrally disposed reference element 76 similar to the reference elements on discs 56 and 57.

Referring now to the top or outermost disc 59, it will be noted that the disc is provided with a plurality of openings 77 arranged spirally therein in a particular pattern. The disc is subdivided at the peripheral portion thereof into three sectors 78, each sector having a legend 79 printed thereon designating varying vessel speeds ranging from 2.5 knots to 10 knots. The sectors 74 are further provided with centrally disposed reference indexing elements 81 similar to the elements in discs 56, 57, 58 and 59.

In operation of the aforesaid device, assuming for example, that a harbor is intended to be mined by P5M-1 type aircraft against the traffic of a 1,000 ton submarine and that the submarine enters the harbor at a minimum speed of 5 knots and the depth of the harbor is found to be 10 fathoms after referring to the usual hydrographic charts. With aforesaid conditions in view, the device is correlated to the end, Fig. 10, whereupon the type or types of mines for such a mission is determined. During correlation of the device, disc 56 is rotated until reference dot 61 thereon is aligned with the hairline 64 on base 52, holding base 52 and disc 56 against rotative movement, disc 57 is rotated until the reference dot 72 thereon is aligned with the hairline, holding base 52 and discs 56 and 57 against rotative movement disc 58 is rotated until the reference dot 76 is aligned with the hairline, in the final operation the aforesaid discs are held against rotative movement while disc 59 is rotated until the reference dot 81 registers with the hairline. It will be understood, however, when the final operation has been completed, the opening in discs 56, 57, 58 and 59 are disposed in such a manner with respect that only a single window is exposed through which the answer appears, the answer in this instance being the code letter. Referring now to chart 53, it will be seen that the 5-0 type mine is recommended for use under the conditions selected.

In view of the foregoing, it will be apparent that a new and improved selector device has been devised wherein means are provided for quickly and efficiently obtaining the solution of various problems relating to a mine planting mission thereby to determine the proper type of mine to be used on a particular type of target and under varying conditions. Moreover, while the aforesaid device has been described in connection with solution of problems concerning the type of mine to be used during a specific mine planting operation, it will be understood, however, that if desired, the selector device may be arranged in such a manner as to obtain the solution of a large number of problems relating to a wide variety of different items.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. In a device of the class described, a base having the face thereof arranged to present a plurality of closely spaced sectors arranged in substantially abutting relation, a purality of circumferentially and radially arranged different code symbols disposed in closely spaced mutual adjacency within each of said sectors, a first disc rotatably mounted on said base and having a sector window settable into coincidence with any one of said sectors on said base and within which said symbols are enclosed, a second disc superimposed on said first disc and rotatably supported on said base, a second sector window in said second disc and having a pair of mutually spaced opaque portions adjacent thereto to provide an elongated window centrally disposed therebetween within which a selected radial array of symbols are enclosed, third, fourth and fifth discs superimposed on said second disc in the order named and rotatably supported on said base, said third, fourth and fifth discs each having a sector thereon consisting of a plurality of opaque portions for providing a plurality of angular offset and radially staggered windows thereon which are progressively smaller with respect to each other and with respect to the windows in said first and second discs, said discs being adapted to be selectively rotated to a selected position to obscure all code symbols within within said first named sector except the selected sector enclosed by a single window of said fifth disc through which only the selected code symbol appears, said discs being of progressively smaller diameter and each moveable through at least one complete revolution with respect to the other discs and with respect to said base, thereby to provide means manually engageable for maintaining said discs in a selected setting as the discs are moved to said setting in predetermined sequential order.

2. In a device of the class described, a base having the face thereof arranged to present a plurality of closely spaced sectors arranged in mutually abutting relation, a plurality of circumferentially and radially disposed different code symbols disposed in closely spaced mutual adjacency within each of said sectors, a first disc rotatably mounted on said base and having a first segmental sector window settable into coincidence with any one of said sectors on said base, a second disc superimposed on said first disc and rotatably supported on said base, a second segmental sector window on said second disc and having a pair of mutually spaced opaque portions adjacent thereto for providing an elongated window centrally disposed therebetween within which a selected radial array of symbols are enclosed, smaller in size than the window in said first segmental sector, a third disc superimposed on said second disc and rotatably supported on said base, a third segmental sector on said third disc and having a plurality of opaque portions for providing a plurality of angular offset and radially staggered windows smaller in size than the windows in said second disc, a fourth disc superimposed on said third disc and rotatably supported on said base, a fourth segmental sector on said fourth disc and having a plurality of opaque portions for providing a plurality of angular offset and radially staggered windows greater in number and smaller in size than the windows in said third sector, and a fifth disc superimposed on said fourth disc and having a plurality of opaque portions for providing a plurality of angular offset and radially staggered windows smaller than the windows in said fourth sector, said opaque portions and windows being arranged such that only a single window of said fifth disc is rendered effective through which only one of said symbols appear when each of said discs has been rotated to a selected setting, said discs being of progressively smaller diameter to provide means manually controlled for preventing spurious movement thereof as the discs are set to desired settings in the order named.

3. A rotatable selector of the character disclosed comprising a circular base having the face thereof covered by a plurality of closely spaced sectors of equal size, a plurality of different code symbols arranged in circumferential and radial order within each of said sectors, five circular discs carried by said base and mounted for separate pivotal movement thereon through at least one complete revolution about a common axis, the first of said discs having a window therein constructed and arranged to be moved into coincidence with a selected one of said sectors, the second of said discs having a segmented window therein for enclosing a radial row of symbols within the first-named window when moved into coincidence therewith, the third of said discs having window means for selecting a fractional portion comprising one third of the symbols enclosed within the window of the second disc when moved into registration therewith, window means in the fourth disc for selecting a fractional part comprising one-third of the symbols selected by the window of the third disc, window means on the fifth disc for selecting a particular symbol only of the group of symbols selected by the fourth disc when the fifth disc is moved into selecting relation therewith, said discs being of progressively smaller diameter in the order named to provide an annular surface thereon extending outwardly from the surface of the next succeeding disc in a manner to provide manually controlled means for retaining each of said discs in a desired setting as the discs are set in predetermined successive order, and means on said base and discs for indicating the selected setting of each of said discs.

4. A selector according to claim 3 in which said windows and symbols are constructed and arranged to effect a selection of any one of 1296 different symbols.

5. A selector according to claim 3 in which the symbols within each of the sectors on the face of the base are arranged in six uniform radial rows.

6. A selector according to claim 5 in which the symbols on each sector of the base are also arranged in 27 arcuate rows defined by 27 different radii from the pivot connection between the discs and said base.

References Cited in the file of this patent

UNITED STATES PATENTS

| | | |
|---|---|---|
| 1,453,100 | Fulgora | Apr. 24, 1923 |
| 1,801,225 | Craven | Apr. 14, 1931 |
| 2,637,499 | Winterfeldt | May 5, 1953 |
| 2,639,091 | Elias | May 19, 1953 |
| 2,674,410 | Bernstein | Apr. 6, 1954 |
| 2,682,372 | Romani | June 29, 1954 |